(12) United States Patent
Faronius (10) Patent No.: US 10,298,375 B2
(45) Date of Patent: May 21, 2019

(54) SYSTEM, METHOD, AND APPARATUS FOR SELECTING DOWNLINK CONTROL INFORMATION FORMAT

(71) Applicant: TELEFONAKTIEBOLAGET LM ERICSSON (PUBL), Stockholm (SE)

(72) Inventor: Carola Faronius, Järfälla (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 82 days.

(21) Appl. No.: 15/512,648

(22) PCT Filed: Dec. 21, 2016

(86) PCT No.: PCT/SE2016/051304
§ 371 (c)(1),
(2) Date: Mar. 20, 2017

(87) PCT Pub. No.: WO2017/116299
PCT Pub. Date: Jul. 6, 2017

(65) Prior Publication Data
US 2018/0234224 A1    Aug. 16, 2018

Related U.S. Application Data (60) Provisional application No. 62/273,034, filed on Dec. 30, 2015.

(51) Int. Cl.
*H04L 5/00* (2006.01)
*H04W 72/04* (2009.01)
(Continued)

(52) U.S. Cl.
CPC .......... *H04L 5/0053* (2013.01); *H04B 7/0686* (2013.01); *H04L 5/006* (2013.01);
(Continued)

(58) Field of Classification Search
CPC .......... H04L 2012/5608; H04W 84/12; H04W 88/08; H04W 80/04; H04W 88/06; H04W 84/18; H04W 74/08
(Continued)

(56) References Cited

U.S. PATENT DOCUMENTS

2012/0009923 A1* 1/2012 Chen ............... H04L 5/0053
455/434
2012/0039170 A1* 2/2012 Ball ............... H04L 5/0007
370/230
(Continued)

FOREIGN PATENT DOCUMENTS

WO    2015116870 A1    8/2015

OTHER PUBLICATIONS

International Search Report and Written Opinion issued in corresponding International Application No. PCT/SE2016/051304, dated Feb. 22, 2017, 16 pages.
(Continued)

*Primary Examiner* — Brenda H Pham
(74) *Attorney, Agent, or Firm* — Rothwell, Figg, Ernst & Manbeck, P.C.

(57) ABSTRACT

Selecting a downlink control information (DCI) format used for transmitting a DCI message in a subframe. The subframe may be used to carry, for instance, voice communication data to support a voice over LTE (VoLTE) application or to otherwise provide downlink (DL) voice coverage. In one aspect, a certain downlink DCI format is selected (e.g., DCI format 1A) when there is a high path loss and/or interfernce scenario, and/or the packet has data with a high priority (e.g., low QCI value). This technique may lead to less dropped calls due to RTP timeout, and may improve perception and mean opinion score (MOS) of VoLTE quality.

22 Claims, 6 Drawing Sheets

(51) Int. Cl.
*H04B 7/06* (2006.01)
*H04W 72/08* (2009.01)

(52) U.S. Cl.
CPC ......... *H04L 5/0087* (2013.01); *H04W 72/042* (2013.01); *H04W 72/08* (2013.01); *H04L 5/0039* (2013.01); *H04L 5/0041* (2013.01); *H04L 5/0064* (2013.01); *H04L 5/0085* (2013.01)

(58) Field of Classification Search
USPC ...................... 370/349, 310.2, 328, 338, 236
See application file for complete search history.

(56) References Cited

U.S. PATENT DOCUMENTS

| | | | | |
|---|---|---|---|---|
| 2013/0250893 A1* | 9/2013 | Li | ......................... | H04W 24/10 370/329 |
| 2014/0211710 A1* | 7/2014 | Guan | .................... | H04W 28/06 370/329 |

OTHER PUBLICATIONS

Research in Motion, UK Limited: "Consideration on E-PDCCH Search Space and Multipelxing Design", 3GPP; TSG RAN WG1, Meeting #89, R1-122721, May 21-25, 2012, Prague, Czech Republic, 6 pages.
International Preliminary Report on Patentability issued in International Application No. PCT/SE2016/051304, dated Apr. 6, 2018, 20 pages.

\* cited by examiner

SYSTEM, METHOD, AND APPARATUS FOR SELECTING DOWNLINK CONTROL INFORMATION FORMAT

CROSS REFERENCE TO RELATED APPLICATION(S)

This application is a 35 U.S.C. § 371 National Stage of International Patent Application No. PCT/SE2016/051304, filed Dec. 21, 2016, designating the United States and claiming priority to U.S. provisional application No. 62/273,034, filed on Dec. 30, 2015. The above identified applications are incorporated by reference.

TECHNICAL FIELD

The present disclosure relates to systems, methods, and apparatuses for selecting downlink control information (DCI) format.

BACKGROUND

Long Term Evolution (LTE), a radio access technology standardized by the $3^{rd}$ Generation Partnership Project (3GPP), is based on orthogonal frequency division multiplexing (OFDM) in the downlink and single-carrier frequency domain multiple access (SC-FDMA) in the uplink. This use of OFDM and SC-FDMA divides transmission resources into time resources and frequency resources. Time resources are divided into subframes that are each 1 millisecond (ms) in duration. Each subframe is in turn generally divided into 12 or 14 slots, each of which is occupied by one OFDM or SC-FDMA symbol. Frequency resources in each subframe are divided into subcarriers. The combination of a particular slot at a particular subcarrier is referred to as a resource element (RE). The subframe can thus divide transmission resources into a plurality of REs. The REs can be organized into resource element groups (REGs) and physical resource blocks (PRBs). Each REG includes consecutive REs (e.g., 4 consecutive REs), while a PRB includes, for example, 72 REs (6 slots×12 subcarriers) or 84 REs (7 slots×12 subcarriers).

A subframe may also be divided into a control region and a data region. The control region may include, for example, 3 slots that carry the Physical Downlink Control Channels (PDCCHs). The PDCCHs are used to carry downlink control information (DCI) messages. Each PDCCH may be allocated transmission resources in units of control channel elements (CCEs). Each CCE includes, for example, 9 consecutive REGs. An aggregation level (L) indicates how many contiguous CCEs (also referred to as consecutive CCEs) are allocated to a PDCCH. Example aggregation levels include 1, 2, 4, and 8, where 8 may be a predetermined maximum number of consecutive CCEs that can be allocated to a DCI message in a PDCCH. An aggregation level of 2, for example, indicates that a PDCCH is allocated 2 consecutive CCEs.

Each PDCCH generally carries one DCI message. The DCI message may indicate, to a particular wireless communication device (WCD) receiving the subframe, which PRBs (if any) in the data region of the subframe are intended for that WCD. For instance, a base station (e.g., evolved node B (eNB)) may include in one subframe data for different WCDs (e.g., UEs). For each of these WCDs, the base station may include in the subframe a DCI message that indicates which PRBs in the subframe are intended for the WCD.

Different DCI formats exist for packing formatting information into a DCI message. Example formats include DCI formats 0, 1, 1A, 1B, 1C, 1D, 2, 2A, 2B, 2C, 3, 3A and 4. DCI formats 0, 3, and 3A are used for granting uplink (UL) transmission resources to WCDs. DCI formats 1, 1A, 1B, 1C, 2, 2A, 2B, and 2C are used for assigning downlink (DL) resources to WCDs (see 3GPP 36.212, section 5.3.3). Different formats may provide for different DCI message sizes. A DCI message with a DCI format of 2 may, in one example, correspond to a bigger size than a DCI message with a DCI format of 1, though DCI message sizes may depend on a subframe's bandwidth. Some DCI formats may correspond to the same size. For example, a DCI message with a DCI format of 1A may have the same size as a DCI message with a DCI format of 0, 3, or 3A.

A DCI format such as 2A may support a spatial multiplexing scheme that uses multiple input/multiple output (MIMO) techniques to transmit different layers (e.g., streams) of data on different transmitters toward different receivers. For instance, a base station may use a transmission rank of 2 to transmit two different streams of data on two respective antennas toward two receivers of a WCD. Further, a DCI format such as 2A may allow physical resource blocks (PRBs) assigned in the DCI message to be non-contiguous.

What is desired is a method and apparatus for selecting a DCI format in which to send a DCI message in a DL subframe.

SUMMARY

The present disclosure is concerned with selecting a downlink control information (DCI) format used for transmitting a DCI message in a subframe. The subframe may be used to carry, for instance, voice communication data to support a voice over LTE (VoLTE) application or to otherwise provide downlink (DL) voice coverage. In LTE, there has been a focus on increasing VoLTE uplink coverage. However, field performance indicates that downlink coverage may be starting to be a limiting factor. Downlink transmission may use MIMO techniques for spatial multiplexing and may assign physical resource blocks (PRBs) that are not contiguous, so as to obtain scheduling flexibility. DCI formats such as, for example, DCI 2 and DCI 2A support the scheduling of such downlink transmissions and may be used in transmitting DCI messages for that scheduling.

The use of DCI 2 or 2A for DL transmissions may, however, create an unbalance with UL transmissions because DCI formats used for granting UL transmission resources may be smaller than the DCI 2A format. This unbalance may be up to 1.7 dB for a subframe with a 20 MHz bandwidth. This unbalance may correspond with a eNB that can receive UL PDCCH grants while not receiving DL assignments, which may cause voice quality to worsen. One way to improve voice quality is to increase the probability that DL real time protocol (RTP) messages will reach an intended WCD or other UE, and to reduce the delay or dropped messages in reaching the WCD.

One way to increase the probability that the messages will reach a WCD with minimal delay is to transmit DCI messages on a PDCCH with a DCI format of 1A. This may be performed as part of DL layer 1 (L1) link adaptation. Extra power and a decreased coding rate may also be applied in transmitting the message.

Using DCI format 1A, however, has a drawback in that DCI format 1A is a small format, which reduces flexibility in scheduling DL resources in a subframe. It may further reduce throughput by generally limiting transmissions to a rank of 1, such that the base station transmits only a single stream of data and does not use MIMO techniques. Thus, format 1A needs to be used with care and selected only when an advantage or gain can be obtained.

Accordingly, the present disclosure relates to switching between different DCI formats for transmitting DCI in a subframe, and more generally relates to selecting a DCI format for transmitting DCI in a subframe. Generally speaking, a smaller downlink DCI format may be selected. Selecting a smaller DL DCI format may have the following advantages. First, it may provide better balance between DL and UL transmissions, which uses UL downlink DCI formats that may also have a smaller format. Second, while the smaller format may arise from a frequency-contiguous PRB assignment that is less flexible, this may result in a smaller amount of DCI to transmit. This may allow the DCI to be transmitted at a decreased coding rate, which may allow it to be transmitted in a more robust manner. Third, a smaller format may correspond with a format that does not support spatial multiplexing, which may improve signal quality of a transmitted subframe. In some cases, this smaller format may be DCI format 1A, which may be selected to maximize probability that a packet will reach a WCD with sufficient signal quality. This selection may be made, however, only when there is a high path loss and/or interfernce scenario, and/or the packet has data with a high priority (e.g., low QCI value). The interference may come from, for example, CRS signals being transmitted in all cells even when no traffic is running. A high-interference scenario may be detected based on not only high error rates (e.g., PDCCH/ePDCCH BLERs) or low signal to noise ratios (SNRs), but further be inferred based on whether a high aggregation level of control channel elements (CCEs) is being used, and whether transmission conditions has indicated a need to employ transmit (Tx) diversity. This technique may lead to less dropped calls due to RTP timeout, and may improve perception and mean opinion score (MOS) of VoLTE quality.

Thus, one aspect of this disclosure relates to a method for sending a downlink control information (DCI) messages in a downlink (DL) subframe through a channel between a base station and a wireless communication device (WCD). The method comprises a step (a), in which the base station determines a level of interference in the channel (e.g., based on a measurement, by the base station or the WCD, of signal to noise ratio (SNR) in the channel or of a block error rate (BLER) in the channel). In step (b), the base station determines whether a certain set of one or more conditions are satisifed, which determining comprises the base station determining (e.g., based on the level of interference in the channel) whether to use a predetermined maximum number N (e.g., N=8) of consecutive control channel elements (CCEs) for transmitting the DCI message in the subframe. In step (c), in response to determining that the set of one or more conditions are satisfied, the base station selects, from among a plurality of DCI formats corresponding to different respective DCI message sizes, a first DCI format (e.g., a DCI format that does not support spatial multiplexing such that the transmission of the subframe is performed with a rank of 1, such as, for example DCI format 1A). In step (d), the base station transmits, to the WCD, the DCI message in the subframe using the first DCI format.

In some embodiments, the plurality of DCI formats consists of the first DCI format and a second DCI format. In some embodiments, the first DCI format requires physical resource blocks (PRBs) that are assigned in the DCI message to be contiguous in frequency.

In some embodiments, the base station is configured such that if the base statin determines that the set of conditions are not satisfied the base station selects the second DCI format, wherein the second DCI format is DCI format 2A.

In some embodiments, the DCI message is transmitted in a physical downlink control channel (PDCCH) in a control region of the subframe.

In some embodiments, determining whether the set of conditions are satisfied further comprises: the base station determining whether any data for the WCD in the subframe is assigned a quality of service class identifier (QCI) corresponding to guaranteed bit rate (GBR) voice conversation. In some embodiments, the QCI corresponding to GBR voice conversation is QCI=1.

In some embodiments, determining whether the set of conditions are satisfied further comprises the base station determining whether to use transmit (Tx) diversity for transmitting the subframe.

In some embodiments, the base station determines the level of interference in the channel based on a measurement by the base station or the WCD of signal to noise ratio (SNR) in the channel or of a block error rate (BLER) in the channel, the base station determines whether to use the N consecutive CCEs for transmitting the DCI message based on the determined level of interference in the channel, and the subframe is a voice over LTE (VoLTE) subframe.

In another aspect, the present disclosure relates to a base station for sending a downlink control information (DCI) messages in a downlink (DL) subframe through a channel between the base station and a wireless communication device (WCD). The base station is adapted to determine a level of interference in the channel and to determine whether a certain set of conditions are satisifed by performing a process comprising the base station determining whether to use a predetermined maximum number N of consecutive control channel elements, CCEs, for transmitting the DCI message in the subframe. The base station is further adapted to, in response to determining that the set of conditions are satisfied, select, from among a plurality of DCI formats corresponding to different respective DCI message sizes, a first DCI format. The base station is further adapted to transmit, to the WCD, the DCI message in the subframe using the selected DCI format.

According some embodiments a method for sending a downlink control information, DCI, message in a downlink, DL, subframe (e.g., a voice over LTE (VoLTE) subframe) through a channel between a base station and a wireless communication device, WCD, includes the step of the base station determining whether a certain set of one or more conditions is satisfied. This determining step includes, at the least, the base station determining whether a maximum control channel element, CCE, aggregation level has been reached. In some embodiments, the base station determines whether the maximum CCE aggregation level has been reached based on a measurement by the base station or the WCD of signal to interference plus noise ratio (SINR) in the channel and/or of a block error rate (BLER) in the channel. In some embodiments, determining whether the set of conditions is satisfied further comprises: the base station determining whether assigned physical resource blocks (PRBs) are contiguous in frequency; and the base station determining whether to use transmit (Tx) diversity.

As a result of determining that the set of one or more conditions is satisfied, the base station selects, from among a plurality of DCI formats corresponding to different respective DCI message sizes, a first DCI format. The base station then transmits to the WCD the DCI message in the subframe using the first DCI format (e.g., the DCI message is transmitted in a physical downlink control channel, PDCCH, in a control region of the subframe). In some embodiments, the plurality of DCI formats consists of the first DCI format and a second DCI format, and the base station is configured such that if the base statin determines that the set of conditions is not satisfied the base station selects the second DCI format, wherein the second DCI format is less robust than the first DCI format (e.g., the first DCI format is DCI format 1A and the second DCI format is DCI format 2 or 2A). The first DCI format can have restrictions on the transport format that has to be used in performing the transmitting step.

In some embodiments, determining whether the set of conditions is satisfied further comprises the base station determining whether any data for the WCD in the subframe is priority data (e.g., data that is assigned a quality of service class identifier, QCI, corresponding to guaranteed bit rate, GBR, voice conversation). In some embodiments, determining whether any data for the WCD in the subframe is priority data comprises the base station determining whether any data for the WCD in the subframe is assigned a priority value that exceeds a threshold (e.g., data that is assigned a quality of service class identifier, QCI, corresponding to guaranteed bit rate, GBR, voice conversation). In some embodiments, determining whether the set of conditions is satisfied further comprises the base station determining whether a restriction on a more robust control scheme can be satisfied.

These and other aspects and embodiments are further described herein.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

DETAILED DESCRIPTION

Figure 1:
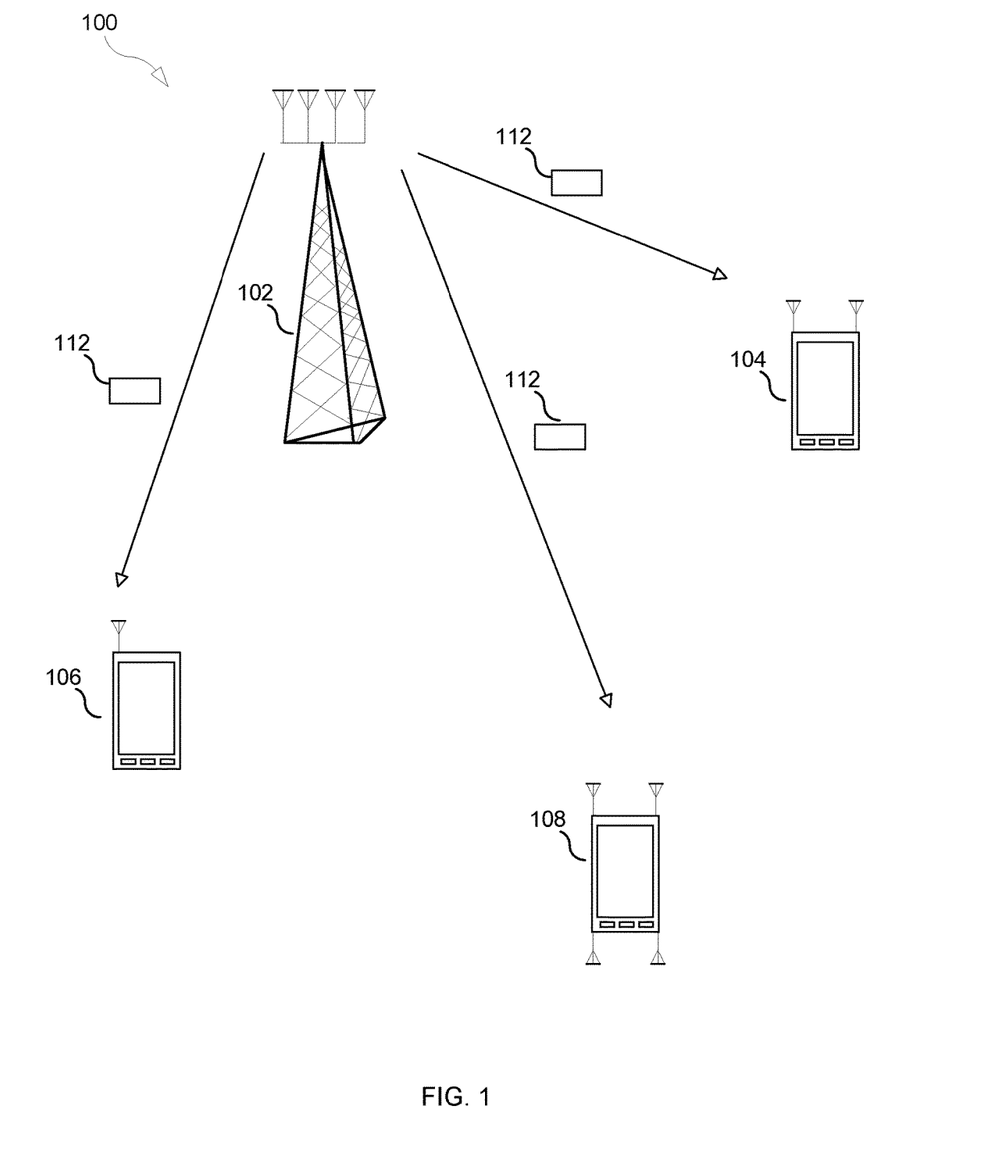
FIG. 1 illustrates a portion of a communications network.

FIG. 1 illustrates a portion of a communications network 100 according to embodiments of the disclosure. As illustrated, network 100 includes a base station 102 (e.g., eNB or NB) of a radio access network (RAN). The base station 102 may communicate with one or more wireless communication devices (e.g., UEs), such as wireless communication devices (WCDs) 104, 106, 108. FIG. 1 illustrates base station 102 transmitting a subframe 112 to WCDs 104, 106, and 108. Each of base station 102 and WCDs 104, 106, 108 includes one or more (e.g., 1, 2, or 4) antennas for transmitting and/or receiving signals. The base station 102 is separated from each of the WCDs 104, 106, 108 by a wireless transmission medium (e.g., air), which may be referred to as a channel. In some instances, the channel may correspond to a specific range of time and frequency resources, such as a channel corresponding to the first two slots of the subframe and to a range of 8 CCEs starting at, e.g., CCE No. 3 and ending at CCE No. 10. This range may be determined, e.g., by a preliminary scheduling operation in the base station.

Figure 2:
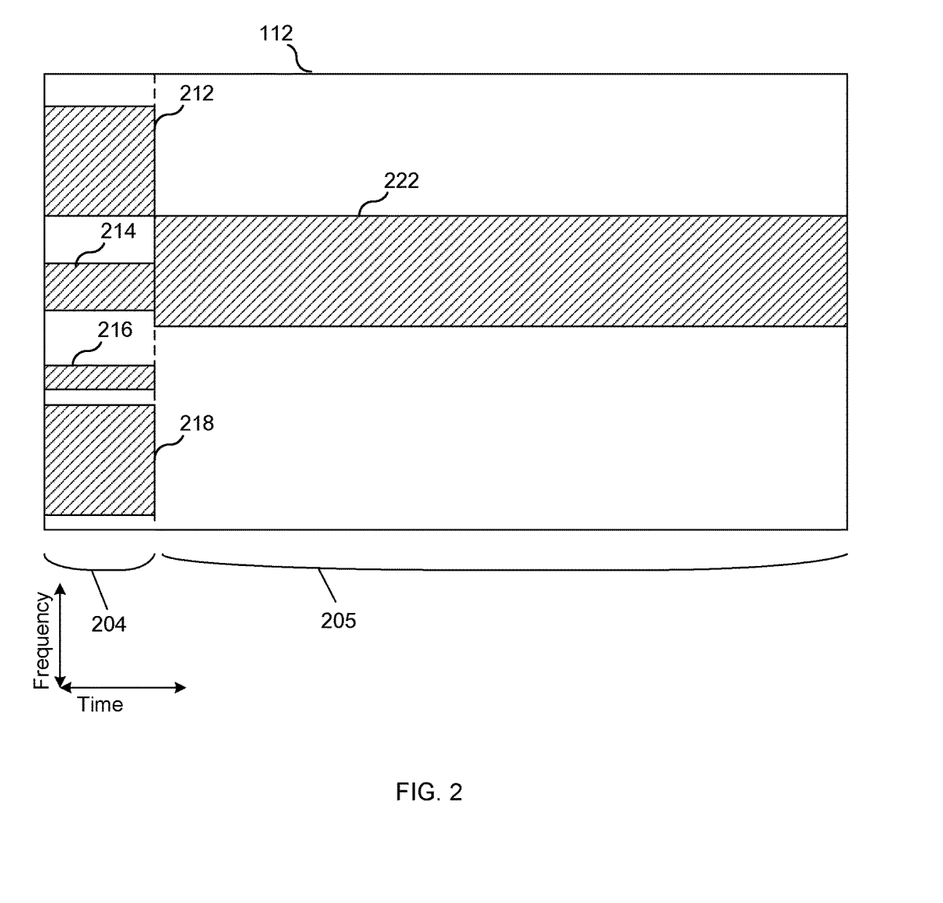
FIG. 2 illustrates a control region and data region of a downlink (DL) subframe.

FIG. 2 illustrates an example structure for downlink (DL) subframe 112. Subframe 112 may include a control region 204 and a data region 205. The control region 204 may include, among other channels, physical downlink control channels (PDCCHs), such as PDCCH 212, PDCCH 214, PDCCH 216, PDCCH 218. Each PDCCH may carry one downlink control information (DCI) message, and may be allocated a number of consecutive control channel elements (CCEs), also referred to as an aggregation level, for its DCI message. FIG. 2 illustrates an example in which PDCCH 216 is allocated 2 consecutive CCEs for its DCI message (i.e., it has an aggregation level of 2), PDCCH 214 is allocated 4 consecutive CCEs (i.e., it has an aggregation level of 4), and PDCCHs 212 and 218 are each allocated 8 CCEs (i.e., they have an aggregation level of 8). In LTE, 8 CCEs may be a predetermined maximum number N of consecutive CCEs that can be allocated for a DCI message in a PDCCH.

FIG. 2 further illustrates that data region 205 of the subframe 112 may include an enhanced PDCCH (ePDCCH) that can also carry a DCI message. Each ePDCCH may occupy one or more enhanced CCEs (ECCEs). Each ECCE may include, e.g, 4 enhanced resource element groups (EREGs). Each EREG may include, e.g., 9 REs. An ePDCCH may also be assigned one of different aggregation levels (e.g., 1, 2, 4, 8 ECCEs). In some implementations, the maximum aggregation level for PDCCHs in the control region may be the same as the maximum aggregation level for ePDCCHs in the data region. Thus, 8 ECCEs may be a predetermined maximum number N of consecutive ECCEs that can be allocated for a DCI message in an ePDCCH. In some implementations, the two channels may have different maximum aggregation levels.

A DCI message in one of the PDCCHs or ePDCCHs of a subframe may provide information to a WCD for finding and decoding DL data in that subframe, or may provide UL grants to the WCD for transmitting UL data in a subsequent subframe. The DCI message may be packaged in different formats, such as DCI formats 0, 1, 1A, 1B, 1C, 1D, 2, 2A, 2B, 3, and 3A. DCI formats 0, 3, and 3A may be used for providing UL grants to a WCD for a subsequent subframe, while DCI formats, 1, 1A, 1B, 1C, 1D, 2, 2A, and 2B may be used for finding and decoding DL data in a subframe. See 3GPP TS 36.212, section 5.3.3.

In one example, DCI format 0 is used for scheduling transmission in physical uplink shared channel (PUSCH) of an uplink subframe, and DCI format 1A is used for scheduling transmission in physical downlink shared channel (PDSCH) of a downlink subframe. Both formats may include a resource block assignment field whose size (e.g., 5-13 bits) depends on a bandwidth (e.g., 1.4 MHz to 20 MHz) of the relevant subframe.

DCI format 0 and DCI format 1A may provide for the same DCI message size. For example, if the number of information bits in format 0 mapped onto a given search space is less than the payload size of format 1A for scheduling the same serving cell and mapped onto the same search space (including any padding bits appended to format 1A), DCI format 0 may require that zeros shall be appended to format 0 until the payload size equals that of format 1A. If the number of information bits in format 1A is less than that of format 0, DCI format 1A may require that zeros shall be appended to format 1A until the payload size equals that of format 0.

In one example, format 0 and format 1A may both require scheduled (or otherwise assigned) physical resource blocks (PRBs) to be contiguous in frequency. The frequency-contiguous PRBs may be mapped to non-consecutive virtual resource blocks (VRBs). The frequency-contiguous assignment may require less bits of DCI, which may allow the DCI to be transmitted at a lower bit rate and/or more robust coding scheme.

In one example, format 1A is used for compact scheduling of one PDSCH codeword in one transport block.

In one example, format 1A may lack support for spatial multiplexing (e.g., lack support for MIMO), which may involve transmitting different layers (e.g., streams) of data on different respective transmitters. A base station may, however, still employ transmit diversity with format 1A, by transmitting the same stream of data on different respective transmitters to, e.g., perform beamforming in transmitting the stream of data.

In one example, DCI format 2A has at least one of the following features: i) it does not require assigned PRBs to be contiguous in frequency, ii) it supports transmission of 2 different transport blocks carrying two respective layers (e.g., streams) of data, and iii) it supports spatial multiplexing.

Using format 1A can increase coverage and voice quality for applications such as VoLTE. It may provide more tolerance against interference, and also provide more balance between DL and UL transmissions. However, format 1A is a generally a smaller format compared to other formats (e.g., 2A), and can limit scheduling flexibility and limit transmission rank to 1 (e.g., limit the number of transmitted layers or streams to 1), which deprives the base station of the opportunity to leverage MIMO for better throughput. Thus, the selection of DCI format 1A needs to be done with care, for situations in which the use of 1A is likely to yield an advantage.

In an embodiment, such situations may correspond with high pathloss and/or interference scenarios, which may further correspond with high error rates (e.g., PDCCH/ePDCCH BLER), a large aggregation level for transmitting the PDCCH/ePDCCH, and/or a need to employ transmit (Tx) diversity. In an embodiment, such situations may correspond with the transmission of high-priority packets, such as those used for real-time voice communication.

Figure 3:
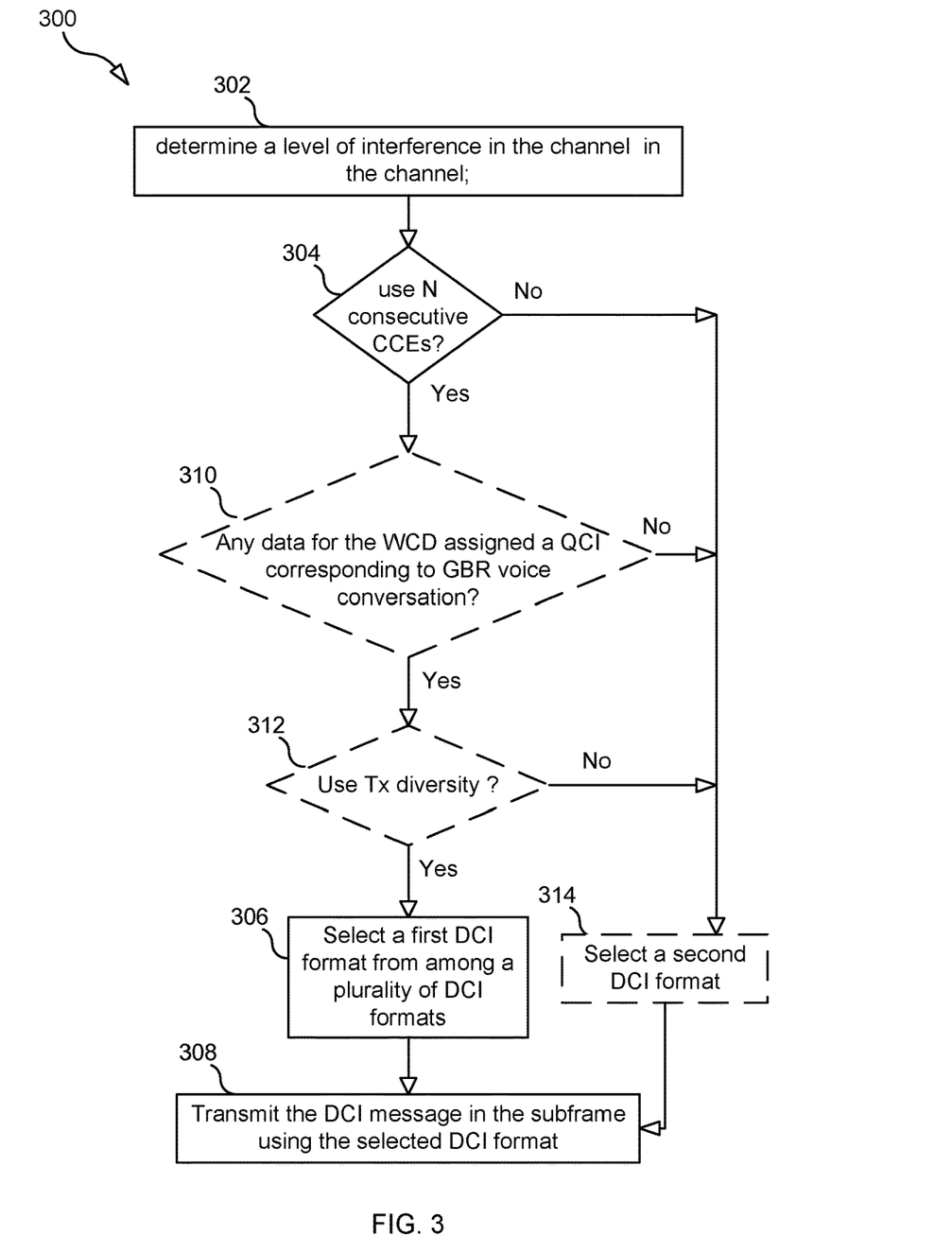
FIG. 3 is a flow chart illustrating processes according to some embodiments of the present disclosure.

FIG. 3 illustrates a method 300 for sending a DCI message in a DL subframe through a channel between a base station (e.g., base station 102) and a WCD (e.g., WCD 104, 106, 108). In an embodiment, method 300 begins at step 302, in which a base station determines a level of interference in the channel (e.g., based on a measurement, by the base station or the WCD, of a signal to noise ratio (SNR) in the channel or of a block error rate (BLER) in the channel (e.g., PDCCH BLER or ePDCCH BLER)). In one example, the interference may arise from multipath effects in the channel. In one example, the interference may arise from an overuse of the channel reference signal (CRS) in all cells even if no traffic is running. In implementations where the measurement is made by the WCD, it may be transmitted to the base station in a measurement report. The SNR or BLER may be a SNR or BLER perceived (e.g., measured) at the base station, or a SNR or BLER perceived at the WCD (e.g., BLER of downlink information in the control region or data region of subframes).

In step 304, the base station may determine (e.g., based on the level of interference in the channel) whether to use a predetermined maximum number N of consecutive control channel elements (CCEs) for transmitting the DCI message in the subframe. In LTE, the predetermined maximum number N may be, e.g., 8 CCEs (corresponding to an aggregation level of 8). The CCEs may refer to CCEs occupied by a PDCCH in a control region of a subframe, or ECCEs occupied by an ePDCCH in a data region of the subframe. The use of a high aggregation level may indicate a high level of interference in the channel, which may make the use of a smaller DCI format (e.g., DCI format 1A) more advantageous. In some instances, the PDCCH and ePDCCH may have the same predetermined maximum number N of consecutive CCEs that each may occupy. In some instances, that predetermined maximum number N may be different for a PDCCH versus an ePDCCH.

In step 306, in response to determining to use the predetermined maximum number N of consecutive CCEs in transmitting the DCI message in the subframe, the base station may select, from among a plurality of DCI formats that correspond to different respective DCI message sizes and that are used to assign downlink (DL) resources in the subframe, a DCI format corresponding to a same DCI message size as a DCI format used to assign uplink (UL) resources. For instance, the base station may select DCI format 1A, which has the same DCI message size as a DCI format (format 0) used to assign UL resources. The selected DCI format may be considered to have an equal size as a DCI format used to assign UL resources based on a comparison of DCI messages for the same subframe bandwidth, and/or based on a comparison of DCI messages that have been bit-padded based on any bit padding requirements in the selected DCI format and/or the UL DCI format.

In step 308, the base station transmits, to the WCD, the DCI message in the subframe using the selected DCI format.

In some implementations, the selected DCI format in step 306 may be one that does not support spatial multiplexing, such that the transmission of the subframe is performed with a rank of 1. The base station may perform PDSCH link adaptation to determine whether it shall select a rank of 1. In some implementations, the selected DCI format may require physical resource blocks (PRBs) that are assigned in the DCI message to be contiguous in frequency. In some implementations, the selected DCI format does not support transmission of two transport blocks in the subframe. In some implementations, as mentioned above, the selected DCI format in step 306 may be DCI format 1A.

In an embodiment, the base station may further determine, in step 310, whether any data in the subframe is assigned a QoS class identifier (QCI) corresponding to guaranteed bit rate (GBR) voice conversation (e.g., QCI=1). The selection of the specific DCI format in step 306 may be performed further in response to the determination in step 310 that data in the subframe is assigned the QCI corresponding to GBR voice conversation. In some cases, step 310 may be performed only if the base station determined in step 304 to use the predetermined maximum number N of consecutive CCEs.

In an embodiment, the base station may further determine, in step 312, whether to use Tx diversity for transmitting the subframe. Such a determination may be based on, for example, the level of interference in the channel and/or whether there is a need to use beamforming in transmitting the subframe. In some instances, the selection of the specific DCI format in step 306 is performed further in response to the determination in step 312 to use Tx diversity. In some instances, the determination in step 312 may be made only if the base station determined in step 304 to use the maximum number N of consecutive CCEs and determined in step 310 that data in the subframe is assigned a QCI corresponding to GBR voice conversation.

In an embodiment, in response to any of the following determinations, the base station in step 314 selects a DCI format (e.g., 2A) corresponding to a larger DCI message size compared to the DCI format used to assign UL resources: i) the base station determining in step 304 not to use the predetermined maximum number N of consecutive CCEs in transmitting the one or more DCI messages in the subframe; ii) the base station determining in step 310 that no data intended for the WCD in the subframe is assigned a QCI corresponding to GBR voice conversation, and iii) the base station determining in step 312 not to use Tx diversity for transmitting the subframe. In some instances, the DCI format selected in step 314 may support spatial multiplexing and/or transmitting of multiple transport blocks in the subframe. The selected format in step 314 may support spatial multiplexing and/or may allow PRBs assigned in the DCI message to be non-contiguous in frequency. The selected DCI format may be considered to be larger than the DCI format for assigning UL resources based on a comparison of DCI messages for the same subframe bandwidth.

In an embodiment, FIG. 3 may perform steps 304, 310, and 312 in sequential order. This order may start with step 304, 310, or 312, and may be followed by the remaining steps. If any of the steps yields a determination of "No," the method may proceed directly to step 314. Thus, in an embodiment of method 300 in FIG. 3, steps 310 and 312 may be skipped if step 304 yields a determination not to use the maximum number of CCEs.

In some embodiments, steps 304, 310, and 312 are performed either simultaneously or sequentially. For example, the base station may wait until determination steps 304, 310, and 312 have all been performed (such that they are not skipped), and then determine whether the steps all yielded a determination of "Yes" or whether any of the steps 304, 310, and 312 yielded a determination of "No." If each one of steps 304, 310 and 312 yielded a determination of "Yes," the base station may proceed to step 306. If any of the steps 304, 301 and 312 yielded a determination of "No," the base station may proceed to step 314.

Figure 4:
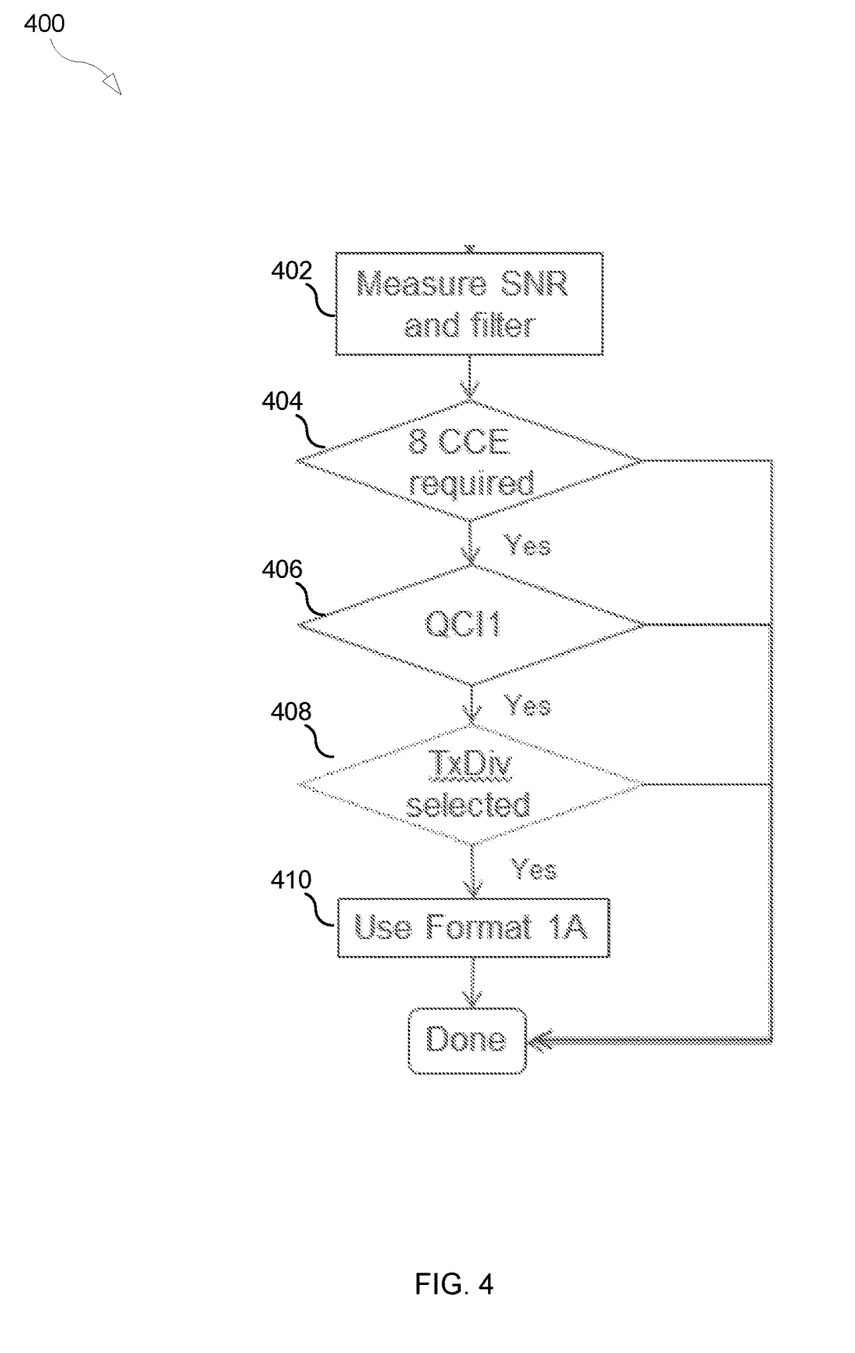
FIG. 4 is a flow chart illustrating processes according to some embodiments of the present disclosure.

FIG. 4 includes an example method 400 according to an aspect of the present disclosure. In an embodiment, the method 400 includes a step 402 in which a base station measures SNR and performs filtering (e.g., to a frequency band corresponding to PRBs assigned to a WCD in a subframe). In step 404, the base station determines whether a DCI message for assigning PRBs to a WCD requires 8 CCEs (e.g., 8 CCEs for a PDCCH or 8 ECCEs for an ePDCCH). In step 406, the base station may determine whether the PRBs being assigned in the DCI message are carrying data having a QCI of 1. In step 408, the base station may determine whether to use Tx diversity for transmitting the subframe. In step 410, the base station selects and uses DCI format 1A to create and transmit the DCI message.

Exemplary Base Station

Figure 5:
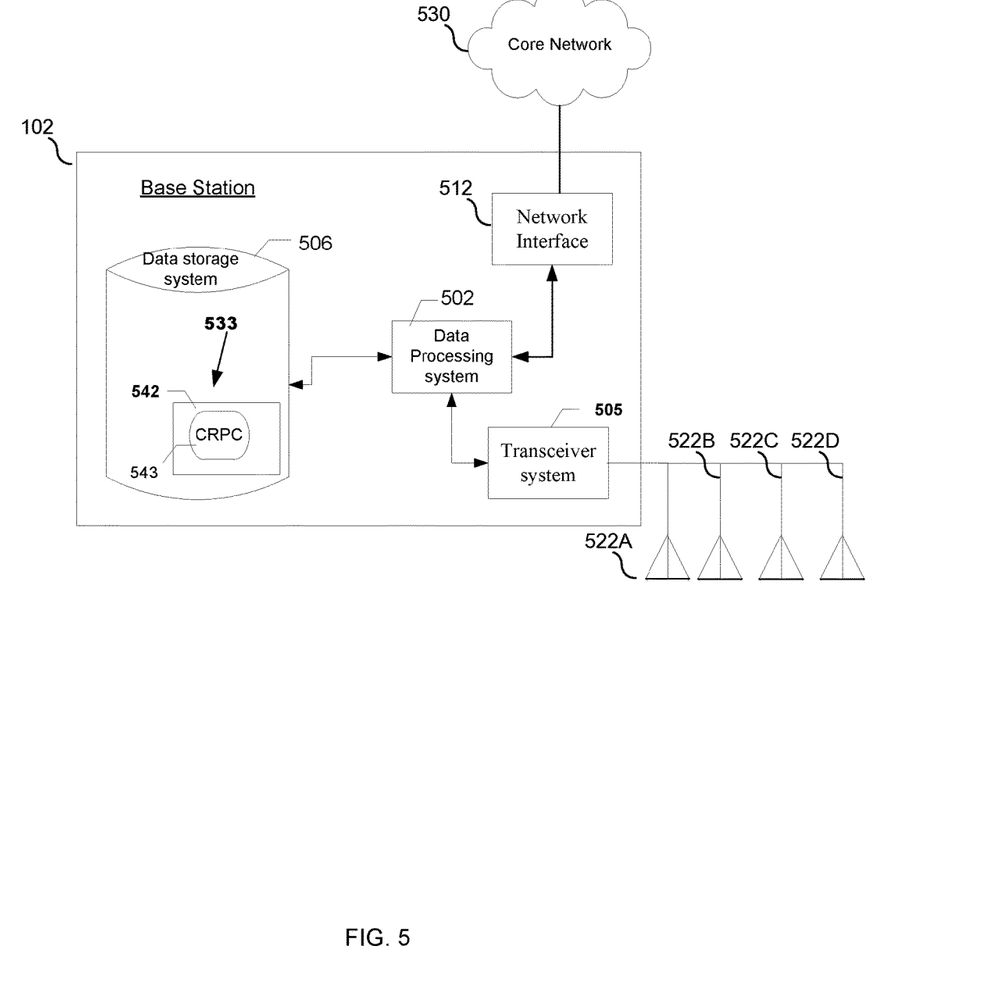
FIG. 5 is a functional block diagram of a base station, according to an embodiment of the present disclosure.

FIG. 5 illustrates a block diagram of a base station 102 (e.g., eNB or NB) and base station controller 502 according to some embodiments. As shown in FIG. 5, base station 102 may include: a controller 502 that takes the form of a data processing system 502, which may include one or more processors (e.g., microprocessors and/or one or more circuits, such as an application specific integrated circuit (ASIC), Field-programmable gate arrays (FPGAs), etc.); a transceiver system 505 and one or more antennas 522A-D for receiving message from, and transmitting messages to, another apparatus such as the WCD 104; a data storage system 506, which may include one or more computer-readable data storage mediums, such as non-transitory data storage apparatuses (e.g., hard drive, flash memory, optical disk, etc.) and/or volatile storage apparatuses (e.g., dynamic random access memory (DRAM)), and which may store information on different DCI formats. In embodiments where data processing system 502 includes a processor (e.g., a microprocessor), a computer program product 533 may be provided, which computer program product includes: computer readable program code 543 (e.g., instructions), which implements a computer program, stored on a computer readable medium 542 of data storage system 506, such as, but not limited, to magnetic media (e.g., a hard disk), optical media (e.g., a DVD), memory devices (e.g., random access memory), etc. In some embodiments, computer readable program code 543 is configured such that, when executed by data processing system 502, code 543 causes the data processing system 502 to perform steps described herein (e.g., steps shown in FIGS. 3-4). In some embodiments, controller 502 may be configured to perform steps described above without the need for code 543. For example, data processing system 502 may consist merely of specialized hardware, such as one or more application-specific integrated circuits (ASICs). Hence, the features of the present invention described above may be implemented in hardware and/or software. The base station 102 may further include a network interface 503 for communicating with a core network. In a UMTS system, the controller may be located in a core network 530. The base station 102 may include a network interface 512 for communicating with the core network 530.

Exemplary Wireless Communication Device (WCD)

Figure 6:
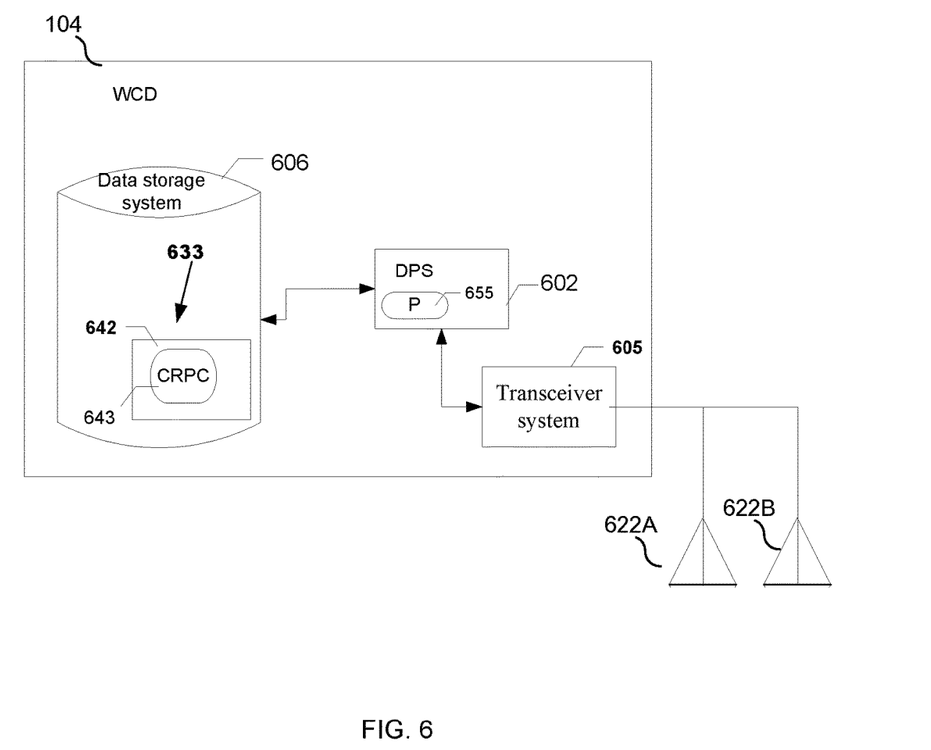
FIG. 6 is a functional block diagram of a wireless communication device, according to an embodiment of the present disclosure.

FIG. 6 illustrates a block diagram of an example of the WCD 104 (e.g., a mobile device or other UE). As shown in FIG. 6, WCD 104 includes: the data processing system (DPS) 602 (which includes, e.g., a digital signal processor (DSP), which may include one or more processors (P) 655 (e.g., microprocessors and/or one or more circuits, such as an application specific integrated circuit (ASIC), Field-programmable gate arrays (FPGAs), etc.); a transceiver system 605, and an one or more antennas 622A-B for wirelessly transmitting and receiving information; a data storage system 606, which may include one or more computer-readable data storage mediums, such as non-transitory memory unit (e.g., hard drive, flash memory, optical disk, etc.) and/or volatile storage apparatuses (e.g., dynamic random access memory (DRAM)).

In embodiments where data processing system 602 includes a processor 655 (e.g., a microprocessor), a computer program product 633 may be provided, which computer program product includes: computer readable program code 643 (e.g., instructions), which implements a computer program, stored on a computer readable medium 642 of data storage system 606, such as, but not limited, to magnetic media (e.g., a hard disk), optical media (e.g., a DVD), memory devices (e.g., random access memory), etc. In some embodiments, computer readable program code 643 is configured such that, when executed by data processing system 602, code 643 causes the data processing system 602 to perform steps described herein (e.g., interference measurement steps).

In some embodiments, WCD 104 is configured to perform steps (e.g., measurement steps) described above without the need for code 643. For example, data processing system 602 may consist merely of specialized hardware, such as one or more application-specific integrated circuits (ASICs). Hence, the features of the present invention described above may be implemented in hardware and/or software. For example, in some embodiments, the functional components of WCD 104 described above may be implemented by data processing system 602 executing program code 643, by data processing system 602 operating independent of any computer program code 643, or by any suitable combination of hardware and/or software.

In some instances, WCD 104 may include 1) a display screen coupled to the data processing system that enables the data processing system to display information to a user of WCD 104; 2) a speaker coupled to the data processing system that enables the data processing system to output audio to the user of WCD 104; and 3) a microphone coupled to the data processing system that enables the data processing system to receive audio from the user.

CONCLUSION

The present disclosure relates to selecting DCI format. DL QCI can be sent with format 1A to maximize probability of the UE receiving the QCI packets. Since format 1A limits the scheduling flexibility as well as limits transmission to Rank 1, it shall be used with care and only be selected once there is gains. For instance, when the UE is in the high pathloss and/or interference limited scenario use 8 CCE aggregation level (maximum allocation for PDCCH) and cannot keep PDCCH/ePDCCH BLER as an option it can be added that the PDSCH link adaptation shall have selected rank 1.

While various embodiments of the present invention have been described above, it should be understood that they have been presented by way of example only, and not limitation. Thus, the breadth and scope of the present invention should not be limited by any of the above-described exemplary embodiments.

Additionally, while the processes described above and illustrated in the drawings are shown as a sequence of steps, this was done solely for the sake of illustration. Accordingly, it is contemplated that some steps may be added, some steps may be omitted, and the order of the steps may be re-arranged.

The invention claimed is:

1. A method for sending a downlink control information (DCI) message in a downlink (DL) subframe through a channel between a base station and a wireless communication device (WCD), the method comprising:
   the base station determining that a set of conditions is satisfied, which determining comprises the base station determining to use a maximum number of control channel elements (CCEs) for transmitting the DCI message in the subframe;
   as a result of determining that the set of conditions is satisfied, the base station selecting, from among a plurality of DCI formats corresponding to different respective DCI message sizes, a first DCI format; and
   the base station transmitting to the WCD the DCI message in the subframe using the first DCI format.

2. The method of claim 1, wherein the plurality of DCI formats consists of the first DCI format and a second DCI format.

3. The method of claim 2, wherein the second DCI format is less robust than the first DCI format.

4. The method of claim 1, wherein the first DCI format has restrictions on the transport format that is used in performing the transmitting step.

5. The method of claim 2, wherein the first DCI format is more robust than the second DCI format.

6. The method of claim 1, wherein,
   the DCI message is transmitted in a physical downlink control channel (PDCCH) in a control region of the subframe.

7. The method of claim 1, wherein determining that the set of conditions is satisfied further comprises:
   the base station determining whether any data for the WCD in the subframe is priority data.

8. The method of claim 7, wherein determining whether any data for the WCD in the subframe is priority data comprises the base station determining whether any data for the WCD in the subframe is assigned a priority value that exceeds a threshold.

9. The method of claim 1, wherein determining that the set of conditions is satisfied further comprises the base station determining whether a restriction on a more robust control scheme can be satisfied.

10. The method of claim 1, wherein
    the base station determining to use the maximum number of CCEs for transmitting the DCI message in the subframe is at least in part based on a measurement by the base station or the WCD of signal to interference plus noise ratio (SINR) in the channel and/or of a block error rate (BLER) in the channel, and
    the subframe is a voice over LTE (VoLTE) subframe.

11. The method of claim 1, wherein determining whether the set of conditions is satisfied further comprises:
    the base station determining whether assigned physical resource blocks (PRBs) are contiguous in frequency; and
    the base station determining whether to use transmit (Tx) diversity.

12. A base station for sending a downlink control information (DCI) message in a downlink (DL) subframe through a channel between the base station and a wireless communication device, the base station comprising:
    a transceiver system for communicating with the WCD; and
    a data processing system comprising one or more processors, the data processing system being in communication with the transceiver system and being configured to:
    determine that a set of conditions is satisfied by performing a process comprising the base station determining to use a maximum number of control channel elements (CCEs) for transmitting the DCI message in the subframe;
    in response to determining that the set of conditions is satisfied, select, from among a plurality of DCI formats corresponding to different respective DCI message sizes, a first DCI format; and
    cause the transceiver system to transmit, to the WCD, the DCI message in the subframe using the first DCI format.

13. The base station of claim 12, wherein a second DCI format from among the plurality of DCI formats is less robust than the first DCI format.

14. The base station of claim 12, wherein the first DCI format can have restrictions on the transport format that have to be used in performing the transmission.

15. The base station of claim 12, wherein the process for determining that the set of conditions is satisfied further comprises:

the base station determining whether assigned physical resource blocks (PRBs) are contiguous in frequency; and the base station determining whether to use transmit (Tx) diversity.

16. The base station of claim 12, wherein the first DCI format is DCI format 1A.

17. The base station of claim 12, wherein, the data processing system is configured to transmit the DCI message in a physical downlink control channel (PDCCH) in a control region of the subframe.

18. The base station of claim 12, wherein the process for determining that the set of conditions is satisfied further comprises the base station determining whether any data for the WCD in the subframe is priority data.

19. The base station of claim 18, wherein determining whether any data for the WCD in the subframe is priority data comprises the base station determining whether any data for the WCD in the subframe is assigned a priority value that exceeds a threshold.

20. The base station of claim 12, wherein the process for determining that the set of conditions is satisfied further comprises determining whether a restriction on a more robust control scheme can be satisfied.

21. The base station of claim 12, wherein the process for determining that the set of conditions is satisfied further comprises the base station determining to use the maximum number of CCEs for transmitting the DCI message in the subframe based on a measurement by the base station or the WCD of signal to interference plus noise ratio (SINR) in the channel and/or of a block error rate (BLER) in the channel, and the subframe is a voice over LTE (VoLTE) subframe.

22. A computer program product comprising a non-transitory computer readable medium storing a computer program comprising instructions which, when executed on at least one processor, cause the at least one processor to carry out the method according to claim 1.

* * * * *